(No Model.)

L. SCHUTTE.
VALVE AND VALVE ACTUATING MECHANISM.

No. 583,714. Patented June 1, 1897.

Witnesses:
Henry Drury
R. Stewart

Inventor:
Louis Schutte
by his atty.
Francis T. Chambers

UNITED STATES PATENT OFFICE.

LOUIS SCHUTTE, OF PHILADELPHIA, PENNSYLVANIA.

VALVE AND VALVE-ACTUATING MECHANISM.

SPECIFICATION forming part of Letters Patent No. 583,714, dated June 1, 1897.

Application filed November 7, 1896. Serial No. 611,310. (No model.)

*To all whom it may concern:*

Be it known that I, LOUIS SCHUTTE, a citizen of the United States of America, residing in the city of Philadelphia, in the county of Philadelphia, in the State of Pennsylvania, have invented a certain new and useful Improvement in Valves and Valve-Actuating Mechanism, of which the following is a true and exact description, reference being had to the accompanying drawings, which form a part thereof.

My invention has especial reference to the construction of valves arranged to permit the exit of air from a chamber or conduit when such chamber or conduit is being filled with liquid, and also to permit the entrance of air into the chamber or conduit when the liquid is withdrawn from it, the construction being such that the valve will be automatically closed when the liquid rises to a determined height.

The nature of my invention will be best understood as explained in connection with the drawings, in which it is illustrated, and in which—

Figure 1:
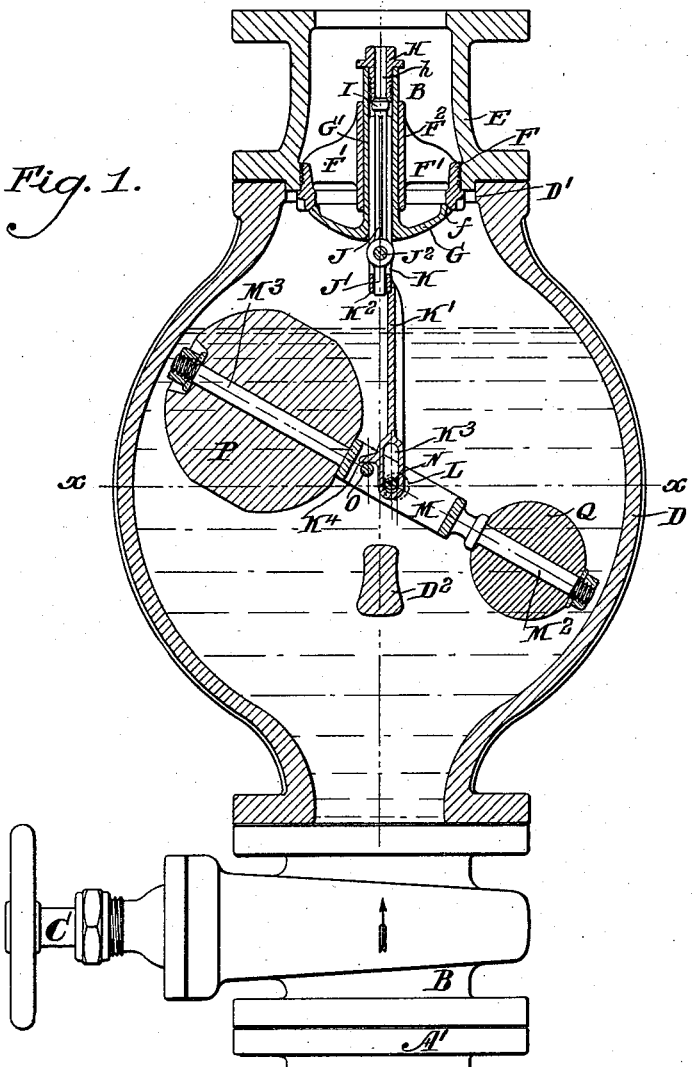
Figure 2:
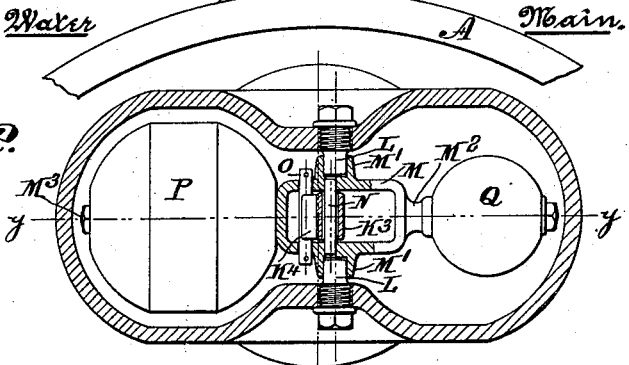

Figure 1 is a side elevation, taken on the section-line $y\ y$ of Fig. 2, showing my improved valve mechanism connected with a water-main; and Fig. 2 is a cross-section taken on the section-line $x\ x$ of Fig. 1.

A indicates a portion of a water-main having an opening at A′, to which is connected the stop-valve connection B, and to which stop-valve connection is in turn connected a receptacle D, C indicating the stop-valve in the connection B. The chamber or receptacle D has an opening, as D′, at its upper part, which opening is to be closed by an inwardly-opening valve, as shown, and for the purpose of permitting the insertion into the chamber D of a float of large diameter the opening D′ is contracted, so to speak, by a supplemental tubular casting F, which can be bolted on the top of the receptacle D, and to the inner lower portion of which is screwed the ring F, having a valve-seat $f$ formed upon it, as shown.

G is a valve adapted to seat itself upon the valve-seat $f$, and thus close the opening in the top of the receptacle. It will be understood that the valve-seat could, if desired, be formed directly on the inside of the opening D′. The valve G has preferably at its center an internally-situated valve-opening. Preferably it is made with a hollow central tubular extension G′, which passes up through a tube $F^2$, which said tube $F^2$ is conveniently secured to the ring F, as by wings F′. At the top of the tubular extension G′ the internal valve-seat is formed as shown, being formed on the lower end of a threaded thimble H, which screws into the top of the tubular extension G′ and which by means of its flange $h$ serves as a stop to regulate the distance to which the valve G can fall below the valve-seat $f$.

I indicates a valve adapted to be seated on the valve-seat formed on the thimble H, and J is the valve-stem of the valve I, which, as shown, is connected by a pin $J^2$ with the upper end K of a rod K′. In the plan shown in the drawings the rods J and K′ are further connected and held together by a prolongation J′ of the rod J passing through an opening $K^2$, formed near the top of the rod K′. At the lower end of the rod K′, I prefer, as shown in the drawings, to form a slot $K^3$ and a lip $K^4$ for purposes to be hereinafter described.

M is a pivot-lever, the central portion of which, as shown, has the form of a yoke and is connected by trunnions M′ M′ with pivot-pins L L, secured to the sides of the chamber D. From the yoke portion of the lever M extend arms $M^2$ and $M^3$, to which are secured in my preferred construction solid floats, as shown at P and Q, these floats being made of materials of different specific gravity.

N is a pin secured to the lever M eccentrically and passing through the slot $K^3$ of the rod K′, and O is also a pin secured eccentrically to the lever M and arranged so that as the arm of the lever to which it is attached rises the point will come in contact with and press against the lip $K^4$.

When the chamber D is filled only with air, the lever M will in the construction shown rise in a substantially horizontal position, the solid float P being stopped by, for instance, the brace $D^2$, which may extend from side to side of the chamber D. In this position the weight of the valve G will insure that it will fall to the lowermost position permitted. As the liquid flows, for instance, into the pipe A, the valve governed by the stem C being open the air will escape freely through the chamber D and out of the opening at its top. When, however, the water displaces the air and rises into the chamber D, the float P, being of greater size and less specific gravity than the float Q, will rise, causing the pin O to press up on the lip $K^4$ and pushing the rods $K'$ and J and the valve I upward, not only closing the valve-seat upon which the valve I seats itself, but also pushing up the valve G until it seats itself on the valve-seat $f$ and closes the opening in the chamber D. The valves G and I will remain closed until the level of the water in the chamber D by falling permits the float P and the arm $M^3$ of the lever M to move downward. This downward motion of the lever acting through the pin N in the slot $K^3$ of the rod $K'$ draws this rod, the rod J, and the valve I downward, permitting the entrance of air through the thimble H and the hollow valve-stem $G'$, and in case the air-pressure in the chamber D is low the valve G will also open freely when the upward pressure on the rods $K'$ and J is withdrawn. In case, however, the air in the chamber D should be under pressure when the arm $M^3$ of the lever moves downward the valve G will remain closed, being held to its seat by the pressure and the positive opening of the valve I will permit of the escape of the air held under pressure in the chamber D until such time as the water flowing back into the chamber D to take the place of the high-pressure air escaping through the opening in the valve G will again raise the lever-arm $M^3$ and cause the valve I to close the opening.

Having now described my invention, what I claim as new, and desire to secure by Letters Patent, is—

1. The combination with a chamber as D of the valve G adapted to close an opening in said chamber, the valve I adapted to close an opening in valve G and to press against and close said valve G, the valve-stem J extending into chamber D and having formed on or attached to its end a slotted opening $K^3$ and a lip $K^4$, a pivoted lever M having an eccentrically-placed pin N passing through slot $K^3$ and an eccentrically-placed pin O adapted to press upward on lip $K^4$, and a float or floats secured to the pivoted lever all substantially as and for the purpose specified.

2. The combination with a chamber as D of the valve G adapted to close an opening in said chamber, the valve I adapted to close an opening in valve G and to press against and close said valve G, the valve-stem J extending into chamber D and having formed on or attached to its end a slotted opening $K^3$ and a lip $K^4$, a pivoted lever M, having an eccentrically-placed pin N passing through slot $K^3$ and an eccentrically-placed pin O adapted to press upward on lip $K^4$, and two solid floats one secured to each end of the lever and each formed of material of different specific gravity from the other.

LOUIS SCHUTTE.

Witnesses:
ROBERT W. LLOYD,
D. STEWART.